(12) United States Patent
Otani (10) Patent No.: US 11,481,920 B2
(45) Date of Patent: Oct. 25, 2022

(54) INFORMATION PROCESSING APPARATUS, SERVER, MOVABLE OBJECT DEVICE, AND INFORMATION PROCESSING METHOD

(71) Applicant: SONY CORPORATION, Tokyo (JP)

(72) Inventor: Takahide Otani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/055,936

(22) PCT Filed: Apr. 19, 2019

(86) PCT No.: PCT/JP2019/016854
§ 371 (c)(1),
(2) Date: Nov. 16, 2020

(87) PCT Pub. No.: WO2019/225249
PCT Pub. Date: Nov. 28, 2019

(65) Prior Publication Data
US 2021/0233271 A1    Jul. 29, 2021

(30) Foreign Application Priority Data
May 21, 2018   (JP) .............................. JP2018-096895

(51) Int. Cl.
*G06K 9/00* (2022.01)
*G06T 7/73* (2017.01)
*H04N 5/232* (2006.01)

(52) U.S. Cl.
CPC ............... *G06T 7/73* (2017.01); *H04N 5/232* (2013.01)

(58) Field of Classification Search
CPC ......... G06T 7/73; G06T 7/0002; H04N 5/232; H04N 5/23229; H04N 5/247;
(Continued)

(56) References Cited

U.S. PATENT DOCUMENTS

| 2016/0217612 A1 | 7/2016 | Petill et al. |
| 2017/0318019 A1* | 11/2017 | Gordon ................. H04L 9/3226 |
| 2018/0292507 A1* | 10/2018 | Voulouzan ............... G01S 5/06 |

FOREIGN PATENT DOCUMENTS

| JP | 2018-508849 A | 3/2018 |
| WO | 2016/016955 A1 | 2/2016 |
| WO | 2016/122898 A1 | 8/2016 |

OTHER PUBLICATIONS

International Search Report and Written Opinion of PCT Application No. PCT/JP2019/016854, dated Jul. 30, 2019, 09 pages of ISRWO.

(Continued)

*Primary Examiner* — Stephen P Coleman
(74) *Attorney, Agent, or Firm* — Chip Law Group (57) ABSTRACT

An information processing apparatus includes a scene obtaining unit and a suitability determining unit. The scene obtaining unit is configured to obtain a scene including position and attitude information of a movable object equipped with a camera and information regarding a three-dimensional shape of an object to be imaged, the object to be imaged being imaged by the camera. The suitability determining unit is configured to determine suitability of the scene on the basis of suitability data indicating whether or not the obtained scene is suitable for localizing processing.

13 Claims, 8 Drawing Sheets

(58) Field of Classification Search
CPC ......... H04N 21/23418; H04N 21/2662; H04N 21/42202; H04N 21/4223; H04N 21/4318; H04N 21/44008; H04N 21/6587; H04N 5/23206
USPC ........................................................ 382/103
See application file for complete search history.

(56) References Cited

OTHER PUBLICATIONS

Amos, et al., "Recognising and Modelling Landmarks to Close Loops in Outdoor SLAM", Proceedings 2007 IEEE International Conference on Robotics and Automation, Roma, Italy, Apr. 10-14, 2007, pp. 2036-2041.

* cited by examiner

| ID | Position (longitude/latitude) | Attitude (gyro/geomagnetic) | Three-dimensional shape (group of three-dimensional coordinates) |
|---|---|---|---|
| 1 | 35° 37′ 53″ N / 139° 44′ 35″ E | aa/bb | ... |
| 2 | 35° 37′ 4″ N / 139° 43′ 43″ E | cc/dd | ... |
| ⋮ | ⋮ | ⋮ | ⋮ |

INFORMATION PROCESSING APPARATUS, SERVER, MOVABLE OBJECT DEVICE, AND INFORMATION PROCESSING METHOD

CROSS REFERENCE TO RELATED APPLICATIONS

This application is a U.S. National Phase of International Patent Application No. PCT/JP2019/016854 filed on Apr. 19, 2019, which claims priority benefit of Japanese Patent Application No. JP 2018-096895 filed in the Japan Patent Office on May 21, 2018. Each of the above-referenced applications is hereby incorporated herein by reference in its entirety.

TECHNICAL FIELD

The present technology relates to an information processing apparatus that estimates a self-position, to method and program therefor, and to server and movable object device utilizing them.

BACKGROUND ART

An autonomous mobile apparatus described in Patent Literature 1 extracts from a captured image a disturbance factor, which is a disturbance in self-position estimation, and a landmark used for self-position estimation. Then, this autonomous mobile apparatus selects a landmark that is not affected by the disturbance factor from the captured image and estimates a self-position on the basis of the selected landmark. For example, the disturbance element can include weather and a movable object existing in the surrounding environment of this autonomous mobile apparatus (e.g., described in paragraphs [0025] to [0027] of the specification).

CITATION LIST

Patent Literature

Patent Literature 1: WO 2016-016955

DISCLOSURE OF INVENTION

Technical Problem

The apparatus of Patent Literature 1 extracts an image of the weather or the movable object as the disturbance factor and removes it to thereby enhance the accuracy of recognition of the landmark and thus enhance the accuracy of self-position estimation. However, position and density of a shadow change depending on a position of the sun in a clear sky or states (direction and illuminance) of light emitted to a target object, for example, and thus the accuracy of localizing processing in self-position estimation lowers.

It is an object of the present disclosure to provide an information processing apparatus and the like by which the accuracy of localizing processing in self-position estimation can be enhanced.

Solution to Problem

In order to accomplish the above-mentioned object, an information processing apparatus according to an embodiment includes a scene obtaining unit and a suitability determining unit.

The scene obtaining unit is configured to obtain a scene including position and attitude information of a movable object equipped with a camera and information regarding a three-dimensional shape of an object to be imaged, the object to be imaged being imaged by the camera.

The suitability determining unit is configured to determine suitability of the scene on the basis of suitability data indicating whether or not the obtained scene is suitable for localizing processing.

The suitability determining unit determines whether or not the obtained scene has the suitability for localizing processing on the basis of the suitability data, and the accuracy of localizing processing can be thus enhanced.

The information processing apparatus may further include a database in which the suitability data is stored as data for associating the position and attitude information of the movable object with the information regarding the three-dimensional shape of the object to be imaged.

The database may be configured to store an unsuitable scene not having the suitability. That is, the suitable scene having the suitability is not stored, and an increase in amount of data of the database can be thus suppressed.

The suitability determining unit may be configured to determine whether or not the scene has the suitability on the basis of the information regarding the three-dimensional shape of the object to be imaged in a case where the suitability determining unit determines that the obtained scene is not stored in the database. Alternatively, the suitability determining unit may be configured to determine whether or not the scene has the suitability by analyzing an image including the object to be imaged in a case where the suitability determining unit determines that the obtained scene is not stored in the database.

The suitability determining unit may be configured to detect a disturbance factor in the image and determine the suitability on the basis of a result of the detection.

The suitability determining unit may be configured to detect at least one of a shadow region or a moving object in the image as the disturbance factor.

The suitability determining unit may be configured to determine the suitability in accordance with a rate of the shadow region existing in the image. Alternatively, the suitability determining unit may be configured to determine the suitability in accordance with a position of the shadow region in the image.

The scene obtaining unit may be configured to obtain the attitude information of the movable object through a motion sensor.

A server according to an embodiment is a server configured to be communicable with a movable object equipped with a camera, the server including a scene obtaining unit and a suitability determining unit.

The scene obtaining unit is configured to obtain a scene including position and attitude information of the movable object and information regarding a three-dimensional shape of an object to be imaged, the object to be imaged being imaged by the camera.

The suitability determining unit is configured to determine suitability of the scene on the basis of suitability data indicating whether or not the obtained scene is suitable for localizing processing.

A movable object device according to an embodiment is a movable object device that is equipped with a camera and is configured to be communicable with a server, the movable object device including whether or not the obtained scene is suitable for localizing processing.

The scene obtaining unit is configured to obtain a scene including position and attitude information of the movable object device and information regarding a three-dimensional shape of an object to be imaged, the object to be imaged being imaged by the camera.

The suitability determination requesting unit is configured to request the server to determine suitability of the scene on the basis of suitability data indicating whether or not the obtained scene is suitable for localizing processing.

An information processing method according to an embodiment includes obtaining a scene including position and attitude information of a movable object equipped with a camera and information regarding a three-dimensional shape of an object to be imaged, the object to be imaged being imaged by the camera.

Suitability of the scene is determined on the basis of suitability data indicating whether or not the obtained scene is suitable for localizing processing.

A program according to an embodiment causes a computer to execute the above-mentioned information processing method.

Advantageous Effects of Invention

Hereinafter, in accordance with the present technology, the accuracy of localizing processing in self-position estimation can be enhanced.

It should be noted that the effects described here are not necessarily limitative and any effect described in the present disclosure may be provided.

MODE(S) FOR CARRYING OUT THE INVENTION

Hereinafter, embodiments according to the present technology will be described with reference to the drawings.

1. Configuration of Information Processing System

Figure 1:
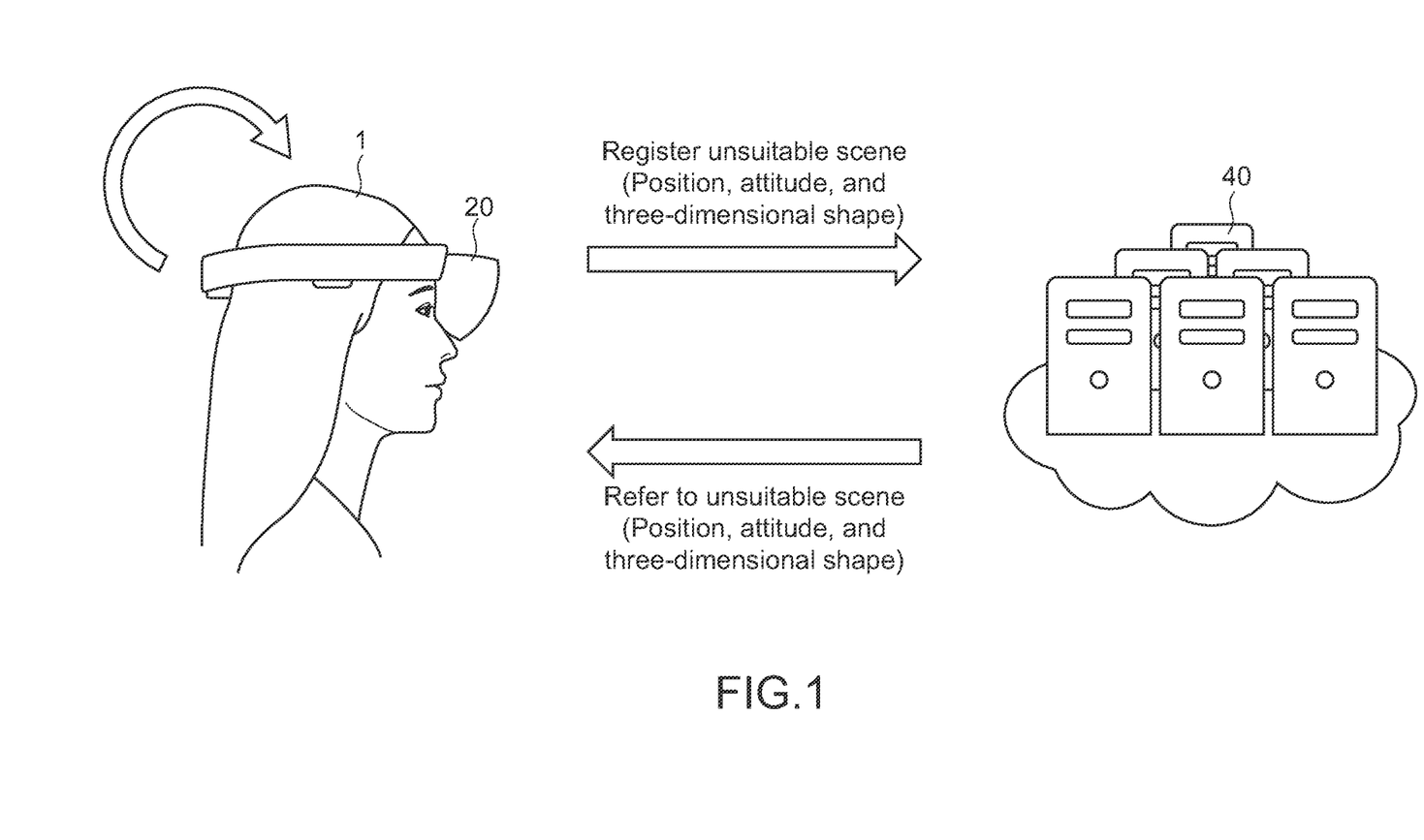
FIG. 1 is a diagram showing the overview of an information processing system according to an embodiment of the present technology.
Figure 2:
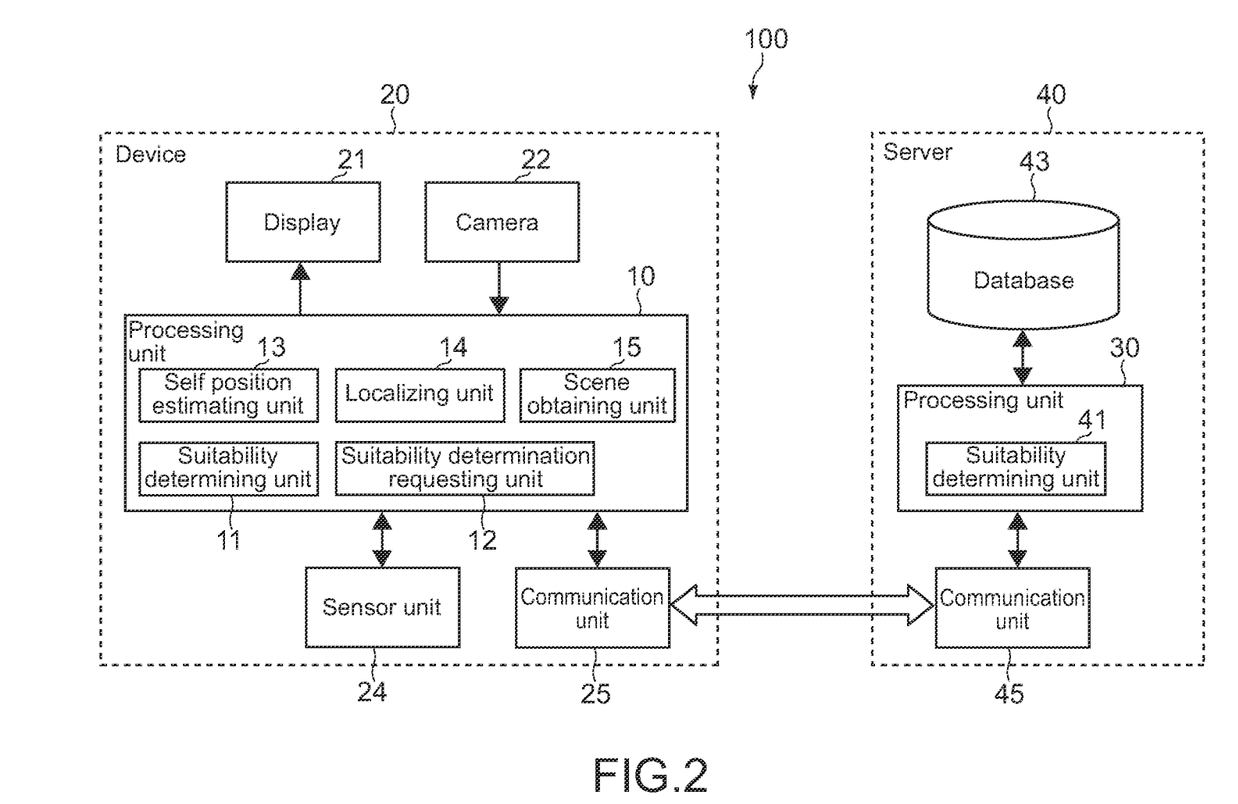
FIG. 2 is a block diagram showing a configuration of this information processing system.

FIG. 1 is a diagram showing the overview of an information processing system according to an embodiment of the present technology. FIG. 2 is a block diagram showing a configuration of this information processing system.

An information processing system 100 includes a server 40 and a device (movable object device) 20 at a client, the device (movable object device) 20 being connected thereto.

The device 20 is a head-mounted display (HMD) device that a user 1 can wear as shown in FIG. 1, for example.

As shown in FIG. 2, the server 40 includes a communication unit 45, a processing unit 30, and a database 43. The communication unit 45 performs communication based on internet protocol (IP) for example with (a communication unit 25 of) the device 20. The processing unit 30 mainly includes a suitability determining unit 41 as will be described later.

The device 20 includes the communication unit 25, a processing unit 10, a sensor unit 24, a display 21, a camera 22, and the like and additionally includes a speaker, a microphone, and the like.

The sensor unit 24 includes a motion sensor, a global navigation satellite system (GNSS) sensor, and the like. The GNSS can include a global positioning system (GPS) and a global navigation satellite system (GLONASS), for example.

The motion sensor includes at least a gyro sensor and further includes at least one of an acceleration sensor or a geomagnetic sensor. The motion sensor detects an attitude of the device 20. Here, the attitude of the device 20 corresponds to a direction of imaging by the camera 22. Further, the GNSS sensor detects a position of the device 20.

The processing unit 10 mainly includes a self-position estimating unit 13, a localizing unit 14, a scene obtaining unit 15, a suitability determining unit 11, and a suitability determination requesting unit 12.

For example, simultaneous localization and mapping (SLAM) is used as a method of estimating a self-position by the self-position estimating unit 13. The SLAM is a technique of performing estimation of a self (movable object) position and generation of an environment map at the same time. Specifically, in accordance with the SLAM, a self-position is estimated on the basis of correspondence relations (matching) between landmarks (three-dimensional shapes) successively stored in three-dimensional coordinates corresponding to a real space and feature points detected from an image captured by the camera 22.

Figure 3:
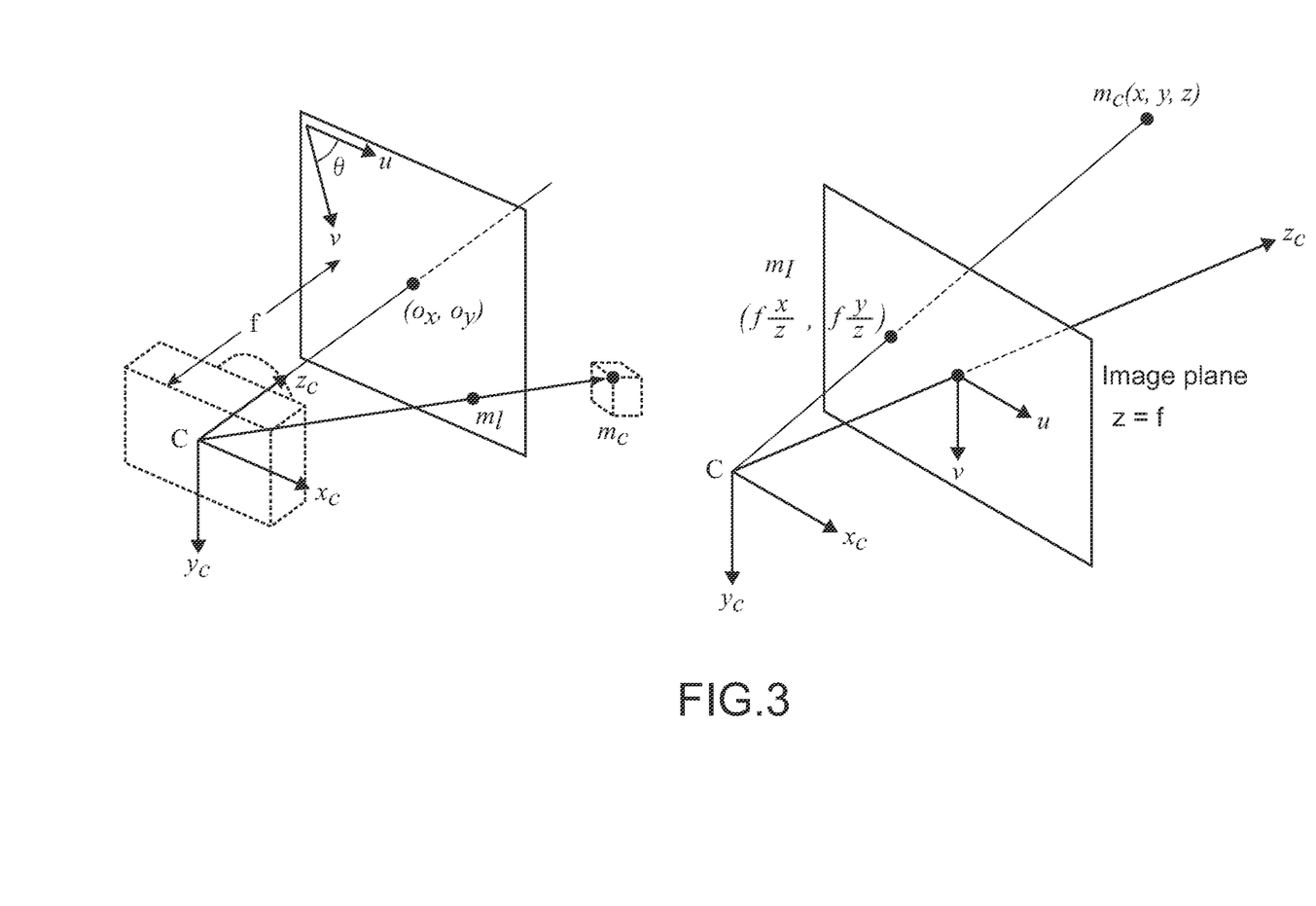
FIG. 3 is a diagram for describing a method of converting a three-dimensional coordinate system into a two-dimensional coordinate system.

FIG. 3 is a diagram for describing a method of converting the three-dimensional coordinate system (X, Y, Z) corresponding to the real space into a two-dimensional coordinate system (image coordinate system) ($x_{image}$ and $y_{image}$) represented by the coordinates of the image of the camera 22. The conversion equation is the following equation (1).

[Formula 1]

$$\begin{bmatrix} x_{image} \\ y_{image} \\ 1 \end{bmatrix} = \begin{bmatrix} k_x & 0 & o_x \\ 0 & k_x & o_y \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix} \quad (1)$$

The coordinate system of the camera 22 is ($x_c$, $y_c$, $z_c$). Parameters of the camera 22 necessary as known values are a focal distance f, a pixel effective size ($k_x$, $k_y$), and an image center ($O_x$, $O_y$).

The localizing unit 14 has a function of performing localizing processing. Localizing is to correct the self-position by comparing it with known reference images registered as parts of the map in order to remove accumulative errors in self-position estimation when generating the map in the SLAM. It is also called loop closure.

Figure 4:
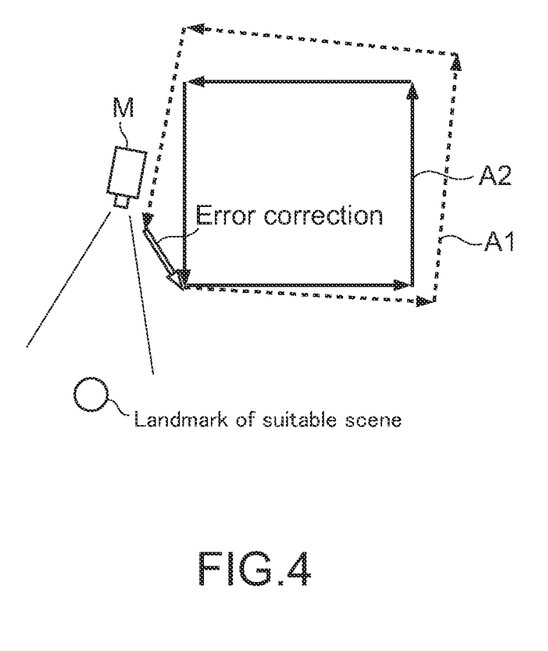
FIG. 4 is a diagram for describing localizing processing in self-position estimation.

FIG. 4 is a diagram for describing localizing processing. The broken-line arrows A1 show a trajectory of a movable object M (corresponding to the device 20) equipped with a camera, which reflects a result of calculation of the self-position in accordance with the SLAM. The solid-line arrows show a correct (actual) trajectory of the movable object M. That is, without localizing, a trajectory as a result of calculation is further from the correct trajectory as calculation errors are accumulated. The movable object M is capable of calculating a correct position by correcting an error by the use of a known suitable image (here, the above-mentioned reference image including a known landmark).

It should be noted that localizing is performed at a predetermined timing. However, the device 20 may dynamically perform localizing in accordance with an image obtained by the camera 22 and a value detected by the sensor unit 24.

The scene obtaining unit 15 obtains data in which information regarding the position of the device 20 detected by the GNSS sensor, information regarding the attitude of the device 20 detected by the motion sensor, and a three-dimensional shape of an object to be imaged, which is detected by the camera 22, are associated with one another, as a scene.

The suitability determining unit 41 of the server 40 has a function of determining whether or not the three-dimensional shape of the object to be imaged of the scene obtained by the scene obtaining unit 15 of the device 20 is suitable for localizing processing in self-position estimation of the device 20 (suitability for using the scene in localizing processing).

Suitability data indicating whether or not the scene obtained from the device 20 is suitable for localizing processing is stored in the database 43 of the server 40. The suitability determining unit 41 determines the suitability of the obtained scene on the basis of the suitability data.

In the database 43, an unsuitable scene not having the suitability is typically stored as the suitability data. The unsuitable scene is used in localizing processing. A suitable scene having the suitability is not stored, and thus the amount of data of the database 43 can be reduced.

The suitability determination requesting unit 12 of the device 20 has a function of requesting the server 40 to perform determination processing described above with respect to the obtained scene.

The suitability determining unit 11 has a function of determining whether or not the scene is suitable for localizing processing in accordance with predetermined algorithm in a case where the suitability data for the scene is not stored in the database 43 of the server 40 (in a case where it is not registered). The algorithm will be described later.

The device 20 that is the HMD device has an augmented reality (AR) or virtual reality (VR) function, for example. The device 20 is capable of performing processing of combining the self-position estimation described above with the AR or VR. In this case, the processing unit 10 is capable of displaying an image captured by the camera 22 on the display 21 in real time and presenting information regarding the position and the surrounding environment and other information with such information overlaid on the captured image.

The processing unit 10 of the device 20 includes hardware such as a central processing unit (CPU), a random access memory (RAM), and a read only memory (ROM), and the main functions of the respective parts can be realized by software stored in the ROM. Instead of or in addition to the CPU, a programmable logic device (PLD) such as a field programmable gate array (FPGA), a digital signal processor (DSP), or the like may be used. The same applies to the processing unit 30 of the server 40.

2. Operation of Information Processing System

Figure 5:
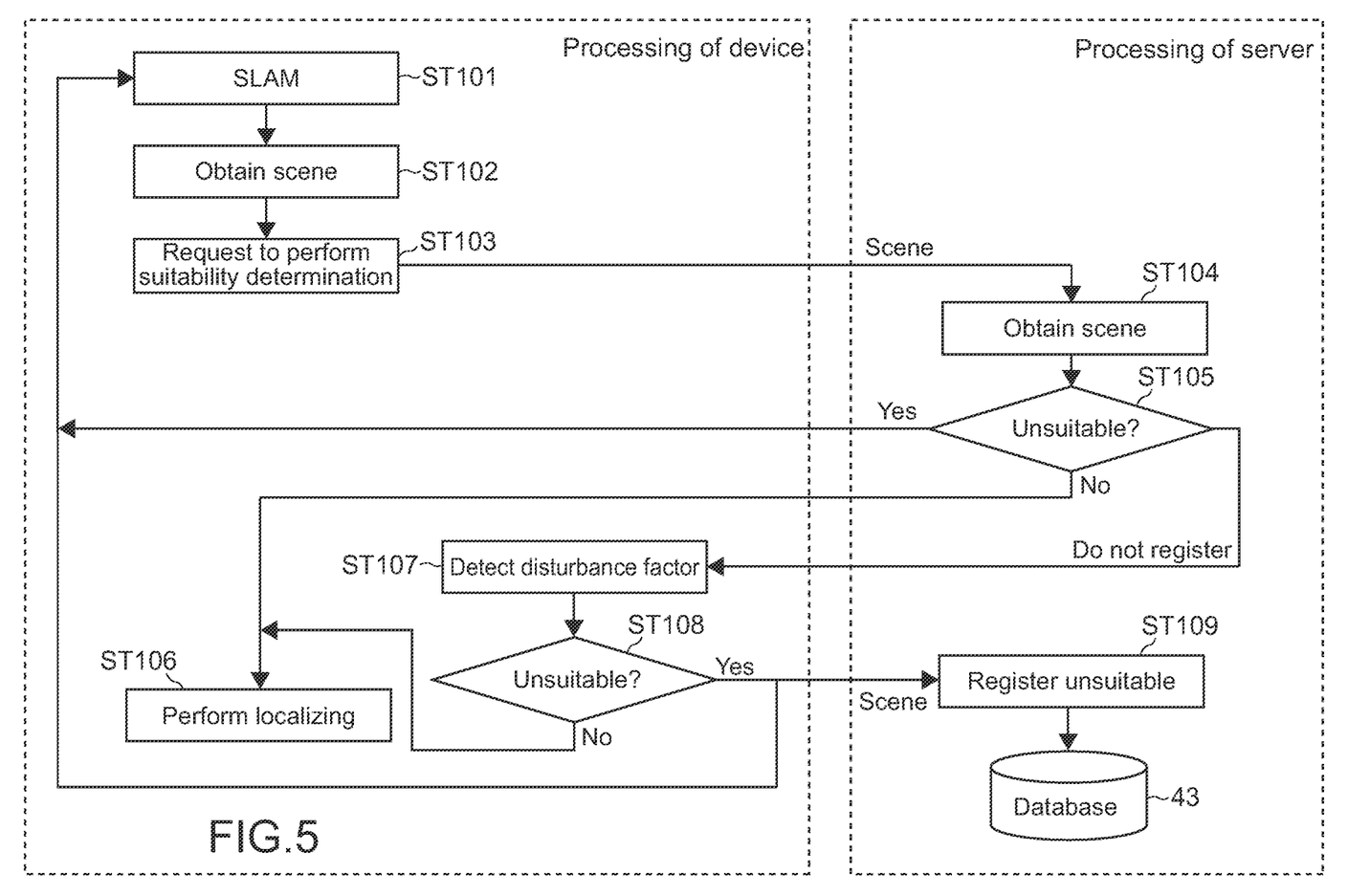
FIG. 5 is a flowchart showing an operation of this information processing system.

FIG. 5 is a flowchart showing an operation of the information processing system 100. Here, the description will be given assuming that the user 1 uses this device 20 outdoor, for example.

2.1) Description of Operation

The self-position estimating unit 13 of the device 20 performs self-position estimation, here, for example, SLAM processing along with movement of the user 1 wearing this device (Step (hereinafter, ST) 101). As described above, in the process of self-position estimation processing, the scene obtaining unit 15 obtains a three-dimensional shape (three-dimensional coordinates of each feature point of the object to be imaged) and the scene obtaining unit 15 further obtains position and attitude information of the device 20 from the sensor unit 24 (ST102).

In order to request to determine the suitability of a scene including the obtained position and attitude information of the device 20 and the information regarding the three-dimensional shape of the object to be imaged (ST103), the suitability determination requesting unit 12 transmits the scene to the server 40.

In ST104, when the server 40 obtains the scene (in this case, the processing unit 30 of the server 40 functions as the scene obtaining unit), the suitability determining unit 41 determines the suitability of the obtained scene on the basis of the suitability data stored in the database 43 (ST105). Specifically, for example, whether or not the obtained scene matches an unsuitable scene stored in the database 43 is determined. The term "matching" means not only perfect matching of the respective pieces of information regarding the position, the attitude, and the three-dimensional shape, but also matching including a mismatch falling within a predetermined range.

Figure 6:
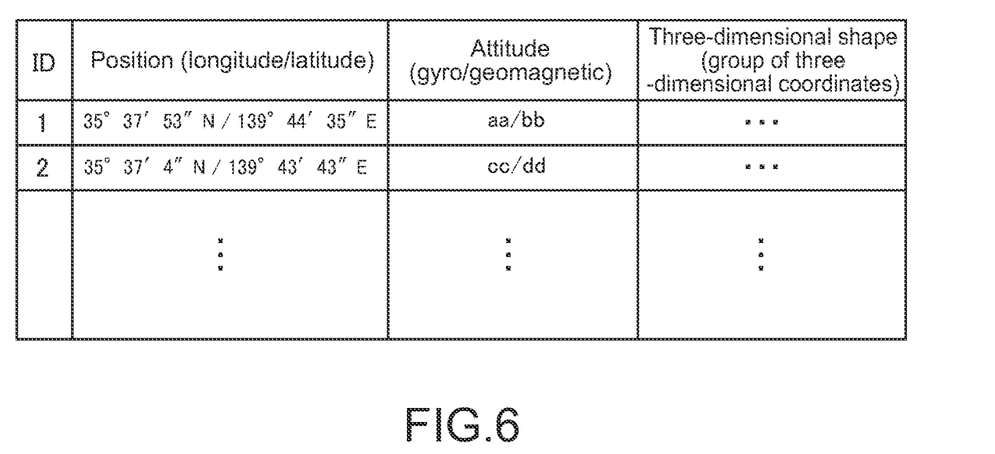
FIG. 6 shows suitability data stored in a database.

FIG. 6 shows the suitability data stored in the database 43. Here, the suitability data is data regarding the unsuitable scene as described above. The suitability data is data regarding the scene processed at the suitability determining unit 11 of the device 20 in Steps 107 and 108 and transmitted to the server 40 as will be described later. The server 40 generates the database by accumulating this suitability data. Therefore, anything is not stored in the database 43 at the start of the operation of the information processing system 100. That is, the server 40 does not determine the suitability with respect to the scene transmitted from the device 20 at the start of the operation of the information processing system 100. After a certain amount of suitability data is accumulated in the database 43, the server 40 determines the suitability on the basis of the suitability data.

It should be noted that the server 40 may store the certain amount of the suitability data in the database 43 in advance before the start of the operation of the information processing system 100 and may determine the suitability after the start of the operation.

The description of the flowchart of FIG. 5 will be continued. In a case where the scene transmitted from the device 20 has the suitability (in a case where it does not match the unsuitable scene) as a result of determination in Step 105, the device 20 performs localizing by the use of the data regarding the three-dimensional shape of the scene (ST106).

In a case where the scene transmitted from the device 20 does not have the suitability as a result of determination in ST105, the processing returns to the self-position estimation processing (ST101) without performing localizing. That is, in a case where the scene is an unsuitable scene, the device 20 cancels registration (storage) of the map even if the feature amount of the image is suitable for matching.

In a case where the obtained scene is not registered in the database 43 as a result of determination in ST105, the suitability determining unit 11 of the device 20 determines whether or not the scene has the suitability on the basis of the information regarding the three-dimensional shape of the object to be imaged, the object to be imaged being imaged by the camera 22.

Specifically, the suitability determining unit 11 detects a disturbance factor (ST107). The disturbance factor can include an object the motion of which greatly changes, specifically, a moving object (e.g., car, human, animal), a shadow, and the like, for example. In particular, a big object to be imaged such as a building and a mountain has a shadow that greatly changes depending on a position of the sun. The suitability determining unit 11 is capable of determining the suitability of the scene by detecting such a disturbance factor (ST108).

In a case where the scene has the suitability as a result of determination in ST108, the processing proceeds to ST106. In a case where the scene does not have the suitability, the device 20 sends the scene to the server 40 as an unsuitable scene and the server 40 registers (stores) it in the database 43 (ST109).

As described above, in this embodiment, the suitability determining unit 41, 11 determines whether or not the scene has the suitability for localizing processing on the basis of the suitability data. Scenes unsuitable for localizing, in particular, a place where movable objects are highly likely to exist such as a shopping district, a place where a shadow changes depending on weather and date and time, a place where vegetation changes depending on seasons, and the like are not registered in the map. As a result, the accuracy of localizing processing by the device 20 can be enhanced.

Further, in this embodiment, the unsuitable scene is stored in the database 43 of the server 40, and thus a plurality of users can share this database 43. Accordingly, rich suitability data can be accumulated. In addition, even if it is the first place for individual users, the devices 20 of those users are capable of performing highly accurate self-position estimation and localizing processing.

Hereinafter, a method of determining the suitability of the scene in ST108 will be described. Here, a determination method based on a shadow as a disturbance factor will be described.

2.2) Method of Calculating Position of Sun

Figure 7A:
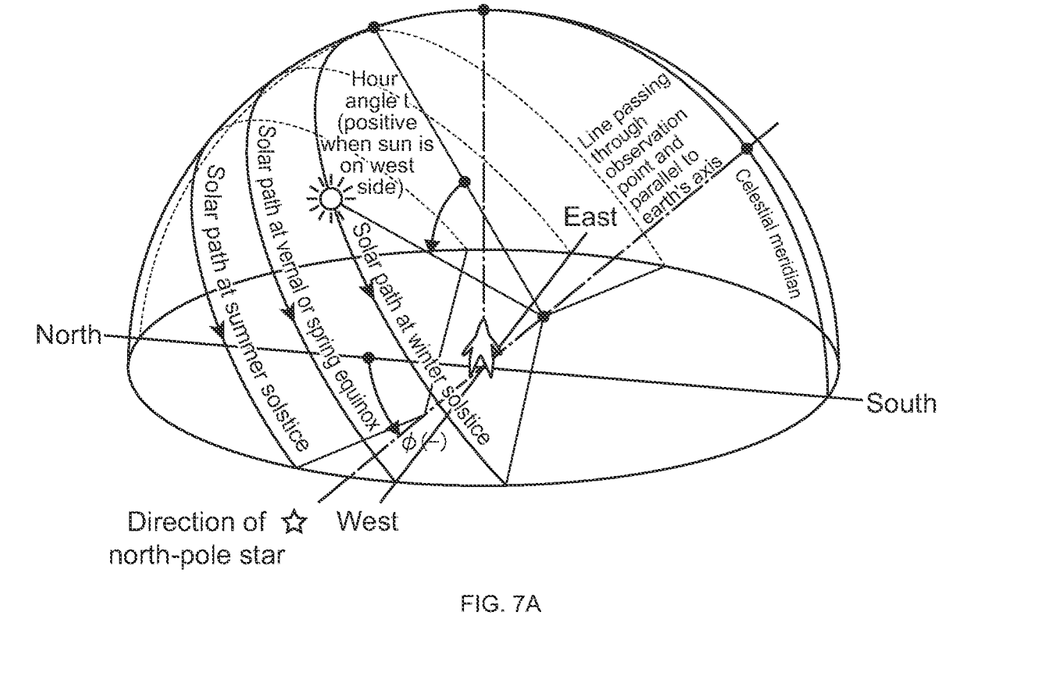
FIGS. 7A and 7B schematically represent a position of the sun as viewed assuming that a position of a user having a device is the center.
Figure 7B:
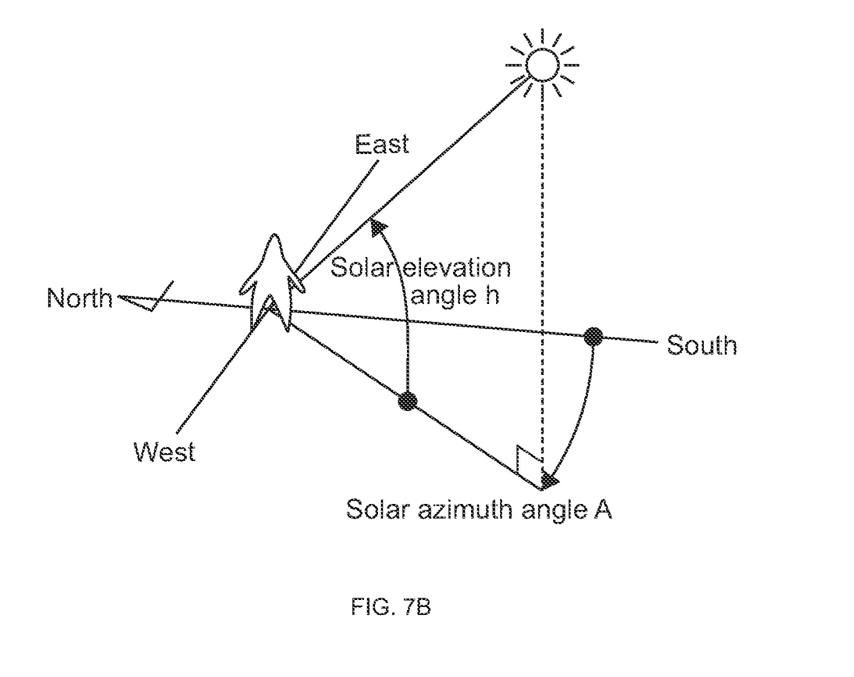

As a premise for calculating a position of the shadow as the disturbance factor, it is necessary to calculate a position of the sun. FIGS. 7A and 7B schematically represent the position of the sun as viewed assuming that the position of the movable object (the user 1 having the device 20) is the center. As shown in FIGS. 7A and 7B, the position of the sun can be determined by the use of the following equations (2) to (5) on the basis of the date and time, the longitude, and the latitude.

$$\sin h = \sin \varphi \sin \delta + \cos \varphi \cos \delta \cos t \quad (2)$$

$$\sin A = \cos \delta \sin t \cos h \quad (3)$$

$$\cos A = \sin h \sin \varphi - \sin \delta \cos h \cos \varphi \quad (4)$$

$$t = 15(Tm-12) + (L-L0) + E \quad (5)$$

$\varphi$: latitude [°]
$\delta$: declination [°]
h: elevation angle [°]
A: azimuth [°]
t: hour angle
Tm: standard time to be calculated [o'clock]
L0: longitude [°] of location representing standard time
L: longitude of location to be calculated [°]
Et: equation of time at time to be calculated [°]

2.3) Method of Calculating Shadow Position

Figure 8:
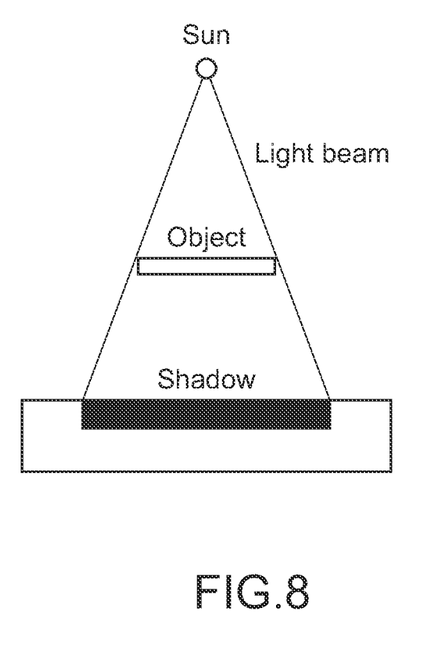
FIG. 8 is a diagram for describing a method of recognizing a position of a shadow as a disturbance factor.

FIG. 8 is a diagram for describing a method of recognizing a position of a shadow as a disturbance factor. In a case where in a straight line linking a three-dimensional point of a target (object) on which a determination as to whether or not a shadow exists is to be made to the position of the sun, another three-dimensional point exists, it can be determined that the three-dimensional point of the target to be determined is the shadow.

2.3) Determination as to Scene Suitability Based on Shadow Position

Once the shadow position can be calculated, the suitability determining unit 11 performs determination processing in accordance with any one of methods in the following examples a) to c) or a method that is a combination of at least two of the methods.

a) Determining that the scene is unsuitable in a case where a shadow region exists in the image irrespective of which region it is.

b) Determining that the scene is unsuitable in a case where a rate of the shadow region in the image is equal to or higher than a certain rate.

c) Determining that the scene is unsuitable in accordance with a position of the shadow region in the image (e.g., in a case where the shadow region exists in a particular region).

2.3.1) Example 1

In a case where the shadow region exists in the lower part of 50% of the image, it can be determined that the scene is unsuitable.

For example, in a case of obtaining the image outdoor, the sky is highly likely to exist in the upper region of the image. Since the sky region often has a flat region, it is unsuitable for image processing such as self-position estimation and a shadow is highly unlikely to be formed. Information (structure having texture) necessary for self-position estimation is highly likely to exist in the lower region of the image and a shadow is also highly likely to be formed in the lower region of the image.

As described above, in a case of performing self-position estimation especially outdoor, it is effective to use whether or not a shadow exists in the lower region of 50% of the image as a criteria for determining the unsuitability.

2.3.2) Example 2

In a case where the rate of the shadow region in the entire image is 50% or more, it can be determined that the scene is unsuitable.

In the self-position estimation, the position and the three-dimensional shape of the camera 22 are estimated on the basis of correspondence relations between feature points of images. In particular, in a complex natural environment, there is a high possibility that correspondence relations between feature points of images are erroneously determined (outliers). A technique such as random sampling consensus (RANSAC) is often used for removing outliers. It determines correspondence relations between dominant feature points in the images as pairs of correct feature points (inliers). If a shadow region is dominant in an image at certain date and time and the shadow does not exist at date and time different from the date and time, effective feature points necessary for self-position estimation are likely to be insufficient.

Therefore, regarding a general scene that is not outdoor or that is not a known environment, it is determined that the scene is unsuitable in a case where the rate of the shadow region in the entire image is 50% or more. In this way, failures in localizing can be prevented more effectively.

Consequently, in this embodiment, it is possible to determine whether or not the shadow exists in the scene on the basis of the date and time, the position information, and the three-dimensional shape of the object to be imaged at the time of imaging and it is also possible to detect the position of the shadow in the image in a case where the shadow exists, and the unsuitable scene can be thus determined more correctly. As a result, failures in localizing can be reduced and the reliability of the whole system in self-position estimation can be enhanced.

3. Modified Examples

The present technology is not limited to the above-mentioned embodiment and various other embodiments can be realized.

In the flowchart shown in FIG. 4, at least one of the respective steps performed by the device 20 may be performed by the server 40. On the contrary, at least one of the respective steps performed by the server 40 may be performed by the device 20. In a case where the server 40 does not exist, the device 20 functions as a single information processing apparatus. In a case where the server 40 exists, the device 20 and the server 40 function as a single information processing apparatus.

In the above-mentioned embodiment, the HMD device has been shown as the device 20 at the client, though it may be another mobile device or wearable device. Alternatively, the device at the client may be a device equipped with a camera, which is installed in an automatic driving automobile or a drone as the movable object, for example.

The unsuitable scene has been shown as the suitability data stored in the database 43 of the server 40. However, the suitable scene having the suitability may also be stored in addition to the unsuitable scene and the suitability determining unit may determine whether the obtained scene is suitable on the basis of those suitable scenes and unsuitable scenes.

In the above section "2.3) Method of Calculating Shadow Position", the shadow position is determined on the basis of the information regarding the three-dimensional shape of the object to be imaged, though the shadow position may be determined by image analysis (e.g., luminance detection or the like).

At least two feature parts of the feature parts of the above-mentioned embodiment can also be combined.

It should be noted that the present technology may also take the following configurations.

(1) An information processing apparatus including:
a scene obtaining unit configured to obtain a scene including position and attitude information of a movable object equipped with a camera and information regarding a three-dimensional shape of an object to be imaged, the object to be imaged being imaged by the camera; and a suitability determining unit configured to determine suitability of the scene on the basis of suitability data indicating whether or not the obtained scene is suitable for localizing processing.

(2) The information processing apparatus according to (1), further including
a database in which the suitability data is stored as data for associating the position and attitude information of the movable object with the information regarding the three-dimensional shape of the object to be imaged.

(3) The information processing apparatus according to (2), in which
the database is configured to store an unsuitable scene not having the suitability.

(4) The information processing apparatus according to (2) or (3), in which
the suitability determining unit is configured to determine whether or not the scene has the suitability on the basis of the information regarding the three-dimensional shape of the object to be imaged in a case where the suitability determining unit determines that the obtained scene is not stored in the database.

(5) The information processing apparatus according to (2) or (3), in which
the suitability determining unit is configured to determine whether or not the scene has the suitability by analyzing an image including the object to be imaged in a case where the suitability determining unit determines that the obtained scene is not stored in the database.

(6) The information processing apparatus according to (4) or (5), in which
the suitability determining unit is configured to detect a disturbance factor in the image and determine the suitability on the basis of a result of the detection.

(7) The information processing apparatus according to (6), in which
the suitability determining unit is configured to detect at least one of a shadow region or a moving object in the image as the disturbance factor.

(8) The information processing apparatus according to (7), in which
the suitability determining unit is configured to determine the suitability in accordance with a rate of the shadow region existing in the image.

(9) The information processing apparatus according to (7), in which
the suitability determining unit is configured to determine the suitability in accordance with a position of the shadow region in the image.

(10) The information processing apparatus according to any one of (1) to (9), in which
the scene obtaining unit is configured to obtain the attitude information of the movable object through a motion sensor.

(11) A server configured to be communicable with a movable object equipped with a camera, the server including:
a scene obtaining unit configured to obtain a scene including position and attitude information of the movable object and information regarding a three-dimensional shape of an object to be imaged, the object to be imaged being imaged by the camera;

a suitability determining unit configured to determine suitability of the scene on the basis of suitability data indicating whether or not the obtained scene is suitable for localizing processing.

(12) A movable object device that is equipped with a camera and is configured to be communicable with a server, the movable object device including:

a scene obtaining unit configured to obtain a scene including position and attitude information of the movable object device and information regarding a three-dimensional shape of an object to be imaged, the object to be imaged being imaged by the camera; and a suitability determination requesting unit configured to request the server to determine suitability of the scene on the basis of suitability data indicating whether or not the obtained scene is suitable for localizing processing.

(13) An information processing method including:

obtaining a scene including position and attitude information of a movable object equipped with a camera and information regarding a three-dimensional shape of an object to be imaged, the object to be imaged being imaged by the camera; and determining suitability of the scene on the basis of suitability data indicating whether or not the obtained scene is suitable for localizing processing.

(14) A program that causes a computer to execute:

obtaining a scene including position and attitude information of a movable object equipped with a camera and information regarding a three-dimensional shape of an object to be imaged, the object to be imaged being imaged by the camera; and determining suitability of the scene on the basis of suitability data indicating whether or not the obtained scene is suitable for localizing processing.

REFERENCE SIGNS LIST 10, 30 processing unit
11, 41 suitability determining unit
12 suitability determination requesting unit
13 self-position estimating unit
14 localizing unit
15 scene obtaining unit
20 device
22 camera
24 sensor section
40 server
41 suitability determining unit
43 database
100 information processing system

The invention claimed is:

1. An information processing apparatus, comprising:
circuitry configured to:
obtain a scene and information corresponding to a three-dimensional shape of an object to be imaged by a camera, wherein
the scene includes position information and attitude information of a movable object,
the movable object is different from the object, and
the movable object is associated with a movable object device that is equipped with the camera;
determine suitability data indicating whether the obtained scene is suitable for localizing processing;
store the suitability data to associate the position information and the attitude information of the movable object with the information corresponding to the three-dimensional shape of the object; and
determine suitability of the obtained scene based on the stored suitability data.

2. The information processing apparatus according to claim 1, wherein the circuitry is further is configured to store the obtained scene that is unsuitable for localizing processing.

3. The information processing apparatus according to claim 1, wherein the circuitry is further configured to determine the suitable data based on the information corresponding to the three-dimensional shape of the object the obtained scene that is not stored in the information processing apparatus.

4. The information processing apparatus according to claim 1, wherein the circuitry is further configured to obtain the attitude information of the movable object based on a motion sensor.

5. The information processing apparatus according to claim 1, wherein
the circuitry is further configured to determine the suitability data based on analysis of an image and the obtained scene that is not stored in the information processing apparatus,
the image is associated with the camera, and
the image includes including the object.

6. The information processing apparatus according to claim 3, wherein the circuitry is further configured to:
detect a disturbance factor in the image, and
determine the suitability based on a result of the detection.

7. The information processing apparatus according to claim 6, wherein the circuitry is further configured to detect at least one of a shadow region or a moving object in the image as the disturbance factor.

8. The information processing apparatus according to claim 7, wherein the circuitry is further configured to determine the suitability based on a rate of the shadow region that is associated with the image.

9. The information processing apparatus according to claim 7, wherein the circuitry is further configured to determine the suitability based on a position of the shadow region in the image.

10. A server configured to be communicable with a movable object, the server comprising:
circuitry configured to:
obtain a scene and information corresponding a three-dimensional shape of an object to be imaged by a camera, wherein
the scene includes position information and attitude information of the movable object, and
the movable object is different from the object;
determine suitability data indicating whether the obtained scene is suitable for localizing processing;
store the suitability data to associate the position information and the attitude information of the movable object with the information corresponding to the three-dimensional shape of the object; and
determine suitability of the obtained scene based on the stored suitability data.

11. A movable object device that is equipped with a camera and is configured to be communicable with a server, the movable object device comprising:
circuitry configured to:

obtain a scene and information corresponding a three-dimensional shape of an object to be imaged by the camera, wherein
    the scene includes position information and attitude information of the movable object device; and
request the server to determine suitability of the scene, wherein the server:
    determines suitability data indicating whether the obtained scene is suitable for localizing processing;
    stores the suitability data to associate the position information and the attitude information of the movable object device with the information corresponding to the three-dimensional shape of the object; and
    determines the suitability of the obtained scene based on the stored suitability data.

12. An information processing method, comprising:
obtaining a scene and information corresponding to a three-dimensional shape of an object to be imaged by a camera, wherein
    the scene includes position information and attitude information of a movable object,
    the movable object is different from the object, and
    the movable object is associated with a movable object device that is equipped with the camera;
determining suitability data indicating whether the obtained scene is suitable for localizing processing;
storing the suitability data to associate the position information and the attitude information of the movable object with the information corresponding to the three-dimensional shape of the object; and
determining suitability of the obtained scene based on a basis of the stored suitability data.

13. A non-transitory computer-readable medium having stored thereon computer-executable instructions which, when executed by an information processing apparatus, cause the information processing apparatus to execute operations, the operations comprising:
obtaining a scene and information corresponding to a three-dimensional shape of an object to be imaged by a camera, wherein
    the scene includes position information and attitude information of a movable object,
    the movable object is different from the object, and
    the movable object is associated with a movable object device that is equipped with the camera;
determining suitability data indicating whether the obtained scene is suitable for localizing processing;
storing the suitability data to associate the position and the attitude information of the movable object with the information corresponding to the three-dimensional shape of the object; and
determining suitability of the obtained scene based on the suitability data.

* * * * *